June 6, 1933.  J. C. VAN BERKEL  1,912,391

SLICING MACHINE

Filed Oct. 26, 1928  2 Sheets-Sheet 1

Inventor:
Johannes C. van Berkel
By Mason & Crane
Att'ys.

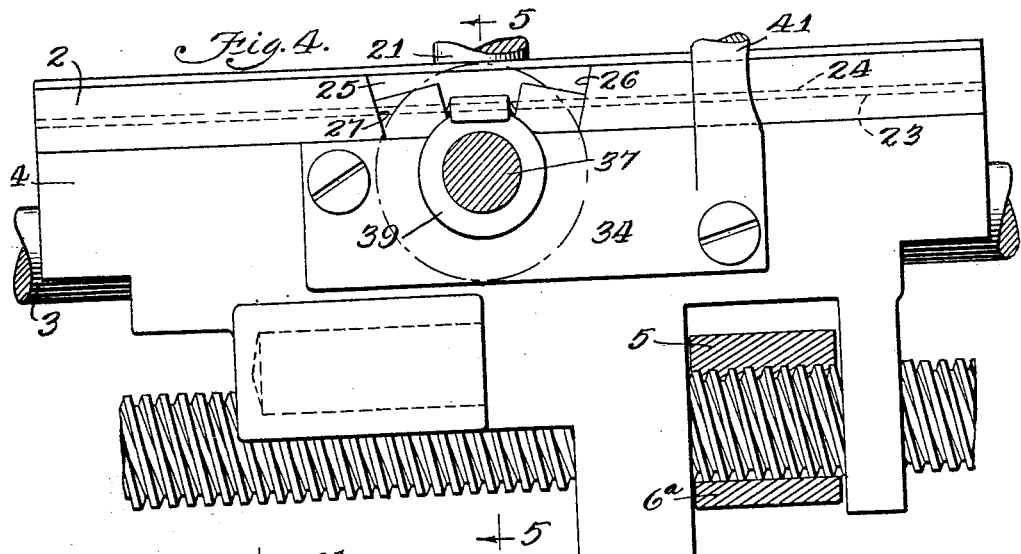
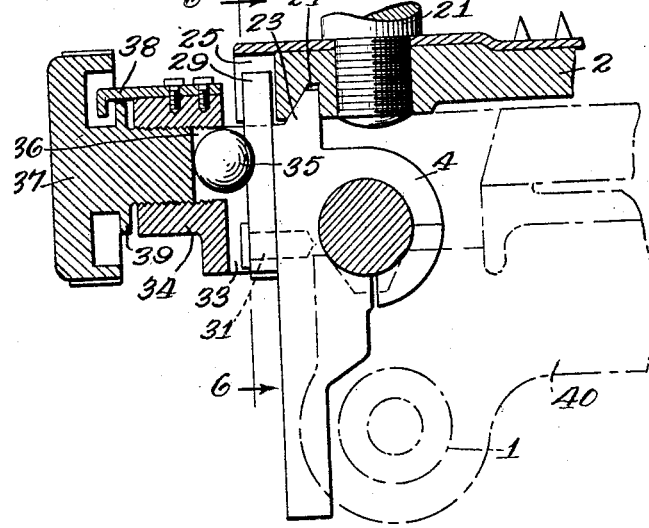
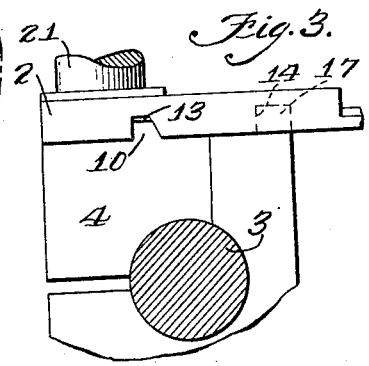
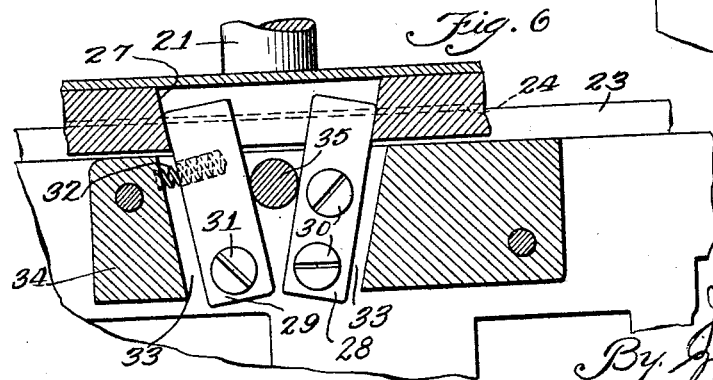

Patented June 6, 1933

1,912,391

UNITED STATES PATENT OFFICE

JOHANNES C. VAN BERKEL, OF COPENHAGEN, DENMARK, ASSIGNOR TO NAAMLOOZE VENNOOTSCHAP MAATSCHAPPIJ TOT VERAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

SLICING MACHINE

Application filed October 26, 1928, Serial No. 315,333, and in Great Britain December 2, 1927.

In the machines generally used for slicing meat and other substances, the substance to be sliced is clamped upon a table (usually termed a "feed table") capable of being fed across an undertable towards a slicing knife by means including a feed screw journaled on the undertable. In some machines, the undertable consists of a reciprocatory or other carriage, whereas in other machines it is rigidly mounted on, or forms part of, the stationary frame of the machine. Usually, the feed table is slidably mounted between guides on the undertable, but it is also known to guide the feed table at one side thereof by what is usually termed a "narrow guide", which, by itself, constrains the feed table to movement along a rectilinear path. The narrow guide consists of relatively movable and stationary guide members.

The present invention relates to slicing machines of the type having a narrow guide.

Usually, in machines of this type, the feed table is slidably supported at the side opposite to the narrow guide and is normally held in contact with its support by some form of restraining means. This support may act also as an additional guide, but, if desired, it may be entirely dispensed with, the feed table then being entirely supported and guided at one side by the narrow guide.

Moreover, the feed table is in some way connected to a "feed nut", which may take various forms, adapted to cooperate with the feed screw in such manner as to impart to the feed table movement towards or away from the knife when the feed screw is rotated. The feed nut is usually mounted on the movable guide member.

It is desirable that the feed table should be removable at will from the machine, and for this purpose means are usually provided for freeing it from the feed screw and the undertable. The feeding mechanism disclosed herein is more fully covered in my co-pending application Serial No. 315,332, filed October 26, 1928.

The object of the present invention is to improve the connection between the feed table and the movable guide member and, to this end, the invention comprises a slicing machine of the type referred to in which the feed table (or the movable guide member) is formed with one or more recesses, or a groove, or the like, and the movable guide member (or the feed table) has one or more projections adapted to engage with the recess, or recesses, or the groove, or the like, for the purpose of locating the feed table correctly on said member, a latch or equivalent device being provided for temporarily locking the feed table in position when so located.

In order that the invention may be clearly understood, two different embodiments thereof, chosen by way of example, will now be described with reference to the accompanying drawings, in which—

Fig. 3 is a fragmentary view looking in the direction of the arrow 3 of Fig. 1;

Fig. 4 is a view similar to Fig. 1 of a modification;

Fig. 5 is a section on the line 5—5 of Fig. 4; and

Fig. 6 is a fragmentary section on the line 6—6 of Fig. 5.

In the drawings, throughout which the same reference characters denote the same parts, only so much of the slicing machine as is necessary for understanding the invention is shown.

Figure 1:
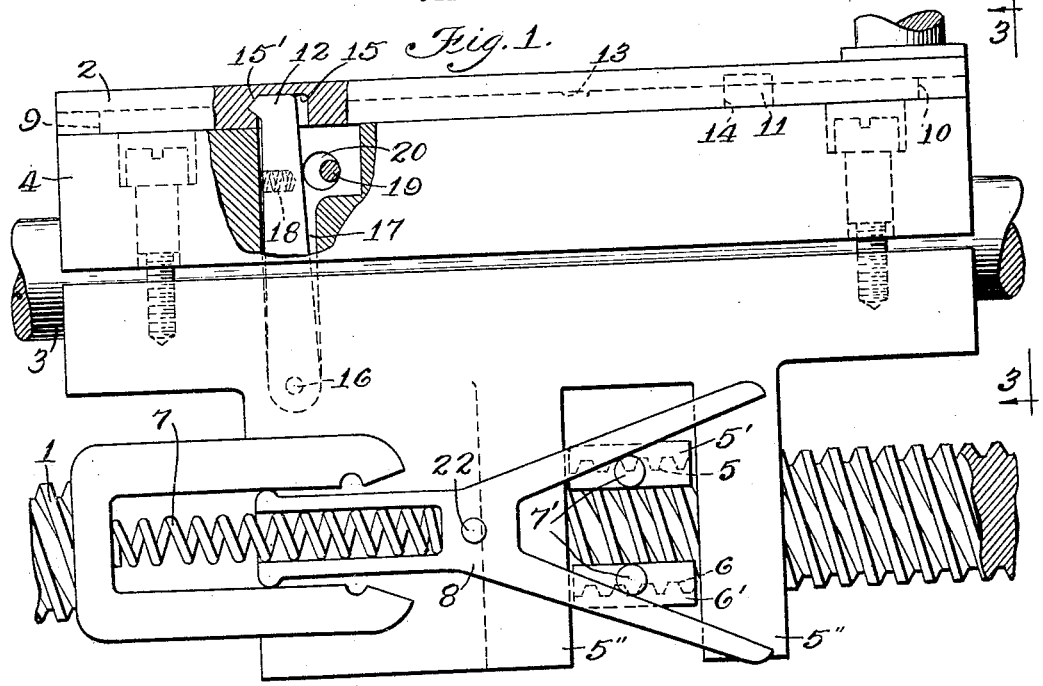
Fig. 1 is a fragmentary elevation, partly in section, showing a feed table in operative position relative to the narrow guide and feed screw of a slicing machine.

The numeral 1 denotes the usual feed screw, 2 the material supporting member or feed table which carries the usual meat clamp support 21, 3 the stationary member of the narrow guide and 4 the movable guide member thereof. The member 3 is constituted by a bar of circular cross-section rigidly secured to the undertable (not shown) of the machine, and the member 4 is a split slide block embracing the bar 3 but freely slidable thereon. The feeding mechanism is described in detail in my co-pending application, Serial No. 315,332 filed October 26, 1928, and in the embodiment illustrated in Figs. 1 to 3, two nut segments 5, 6, constituting a composite feed nut, are provided on levers 5′, 6′ which are pivotally mounted between jaws 5″ on the slide block 4 and are normally urged by a spring 7 into engagement with the feed screw 1, the spring 7 acting on the levers 5′, 6′, through the intermediacy of a member 8 of recumbent Y-form slidably engaging projections or rollers on the ends of levers 5′ and 6′. A spring, not shown, may be positioned between levers 5′ and 6′ to move the nut segments away from the feed screw when a handle member, not shown, co-operating with a projection 22 on the member 8 is operated to move the member 8 to the left, as viewed in Fig. 1.

As shown, the slide block 4 is provided with four upstanding projections 9, 10, 11 and 12 serving as a means for connection between the feed table 2 and the slide block 4. The projections 9 and 10 are disposed in alinement with each other so as to be capable of entering into engagement with a recess or groove 13 formed in the under side of the feed table and extending from end to end thereof. The projections 9 and 10 may, if desired, be formed as a continuous rib co-operating with the groove 13 for the purpose of properly locating the feed table on the slide block. As shown clearly in Fig. 3, the projections 9, 10 and the groove 13 are trapezoidal in cross-section. The projection 11 constitutes an abutment of simple rectangular cross-section and is adapted to enter snugly within a conformably shaped recess 14 in the under side of the feed table. The projection 12 constitutes, in effect, a releasable latch which is engageable with a recess 15 in the under side of the feed table, the recess 15 being large enough to permit a slight pivotal movement of the latch 12 to take place when in engagement therewith.

The toe of the latch 12 is shaped to engage with a conformably shaped notch 15′ in the recess 15. The latch 12 is pivotally mounted at 16 in a pocket 17 in the slide block 4 and is urged by a spring 18 away from the position in which its toe engages with the notch 15′. A hand member 19 is provided for the manual control of the latch 12 and extends from the exterior of the block 4 to the pocket 17. An eccentric 20 on the inner end of the hand member 19 is located within the pocket 17 and bears against the latch 12.

Figure 2:
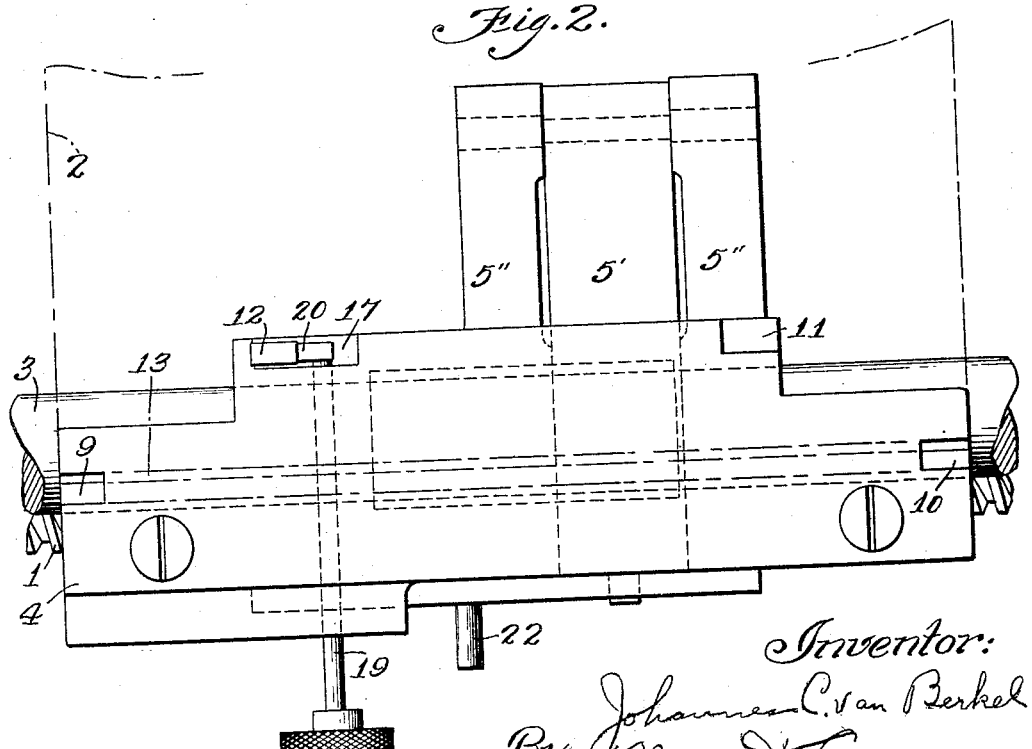
Fig. 2 is a plan view of Fig. 1, the feed table being removed for clearness but its outline being shown in chain dotted lines.

It will be apparent that, when the feed table is placed in position on the slide block 4, the projections 9, 10 and 11 will secure it against lateral movement relative to the block, and, when the hand member 19 is turned into the position in which it has been shown in Figs. 1 and 2, the toe of the latch 12 will engage with the notch 15′ and, at the same time, the wall of the recess 14 will be tightened hard against the projection or abutment 11, whereby the feed table will be effectively locked to the slide block. By turning back the hand member 19, the toe of the latch 12 will be disengaged by the action of the spring 18. Thereafter, the feed table may be lifted straightway clear of the machine.

Referring now to Figs. 4 to 6, the construction therein shown is suitable for application to all slicing machines to which the construction shown in Figs. 1 to 3 is applicable, its arrangement and operation as applied to a slicing machine of the reciprocatory carriage type being illustrated and described in my aforesaid co-pending application, Serial No. 315,332.

It is to be noted that the slicing knife would be located at the left-hand side of the feed table as viewed in Fig. 4, (i. e. at the "near side" of the machine) whereas it would be located at the right-hand side of Fig. 1 (i. e. the "far side" of the machine). The feed screw may be located at either the near side or the far side, as desired, but certain advantages, with which the present invention is not concerned, are obtained by locating it at the near side.

As shown in Fig. 4, the feed nut consists of a toothed nut segment 5, and a smooth guide member 6ª, bearing against the underside of the feed screw 1, co-operates with the segment 5. Both of the parts 5 and 6ª are carried by pivotally mounted levers corresponding to the levers 5′, 6′ of the first embodiment, and, if desired, may be controlled in the same or any other suitable manner. The feed nut is again carried by a split slide block 4 mounted on a bar 3, the slide block 4 being adapted to have the feed table 1 detachably secured to it.

The slide block 4 is provided with an upstanding projection or rib 23 shaped in cross-section similarly to the projections 9, 10 of the first embodiment. The rib 23 is adapted to engage in a conformably shaped recess or groove 24 extending from end to end of the feed table. The rib or projection 23 and groove 24 serve to correctly locate the feed table and block 4 as do the projections 9, 10 and groove 13 in the form shown in Figs. 1 to 3. The near side of the feed table is formed with a wide dovetail recess 25 with walls 26, 27 inclined as shown in Figs. 4 and 6.

The recess 25 is adapted to be entered, and its walls 26, 27 engaged by a pair of stops 28, 29 on the slide block 4. The stop 28 is fixed by screws 30 whereas the stop 29 is pivotally mounted at 31 and is continuously urged by a spring 32 towards the other. The stops 28, 29 are located within an opening 33 in a bracket 34 on the slide block. The stop 29 is a releasable latch and the stop 28 is an abutment co-operating with the latch as does the abutment 11 and latch 12 in the form of the invention shown in Figs. 1 to 3. A ball 35 is also located in the opening 33 and is centered at one side in an aperture 36 and at the other side between the two stops. A hand member 37 is screw-threaded into the aperture 36 and is movable towards and away from the stops between the limits defined by the bracket 34 and an abutment 38 fixed thereon, a collar 39 on the hand member being disposed between the bracket and the abutment.

When the feed table is removed from the machine, the hand member occupies its outermost position (i. e. the position in which the collar 39 bears against, or is near, the abutment 38) and the latch 29 is positioned near the abutment 28. The feed table may be placed upon the machine with the rib or projection 23 in the groove 24 and the abutment 28 and latch 29 in the recess 25. By turning the hand member 37 clockwise, the ball 35 will be forced further between these parts 28, 29, and the latch 29 will be pivoted away from the other. As a result, the abutment 28 and latch 29 will be caused to bear hard against the inclined walls 26, 27, whereby the feed table will be locked to the slide block. By turning the hand member 37 counter-clockwise, the latch 29 will be caused by the spring 32 to move towards the stop 28. When the collar 39 approaches the abutment 38, the feed table may straightway be withdrawn from the machine.

It is important to note that the fixed stop is the farther from the knife, so that the feed table, when positioned on the slide block without being locked thereto, cannot be moved accidentally across the plane of the knife. It will be obvious, therefore, that the stop 28 serves for the same purpose as the projection 11 of the first embodiment.

The numeral 40 denotes the reciprocatory carriage of the machine and 41 a handle by means of which the feed table can be moved across the carriage 40 towards and away from the knife when the feed nut is withdrawn from engagement with the feed screw.

It is to be understood that the embodiments described and illustrated have been chosen simply by way of example and that modifications may be made without departing from the scope of the invention. For instance, the projections (including the latch member) shown on top of the slide block might, instead, be on the under side of the feed table, and the recesses, with which they engage, might be in the slide block.

The term feed table is to be understood to include the attachment known as a display tray, which, as is well known, does not form a permanent part of the machine, but is only fitted to it when slicing has to be performed.

Obviously those skilled in the art may make various changes in the details and arrangements of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. In a slicing machine having a material supporting member and a guide member, means for detachably connecting said members together comprising a trapezoidal projection on one of said members adapted to slidably engage a similarly shaped groove in the other of said members to locate said material supporting member on said movable guide member, and a releasable latch on one of said members engaging the other of said members to lock said members together when located by said projection and recess.

2. In a slicing machine having a material supporting member and a guide member, means for detachably connecting said members together comprising a trapezoidal projection on said guide member adapted to slidably engage a similarly shaped groove in said material supporting member, and a releasable latch on said guide member engaging said material supporting member to lock said members together when located by said projection and recess.

3. In a slicing machine having a material supporting member and a guide member, means for detachably connecting said members together comprising a projection on said guide member adapted to engage a recess in said material supporting member, a releasable latch on said guide member engaging said material supporting member to lock said members together when located by said projection and recess, a spring urging said latch into inoperative position, and hand-operated means carried by said guide member for forcing said latch into operative locking position.

4. In a slicing machine having a material supporting member, a guide member and mechanism associated with said guide member for feeding said members in one direction, means for detachably connecting said members comprising an abutment and a releasable latch on one of said members projecting into a recess in the other of said members, and a screw-operated wedging means bearing against said latch for forcing said latch and abutment against the sides of said recess, said abutment being positioned in said recess to prevent movement of said material supporting member on said guide member in the direction of the feed thereof when said latch is released.

5. In a slicing machine having a material supporting member, a guide member and mechanism associated with said guide member for feeding said members in one direction, means for detachably connecting said members comprising an abutment and a releasable latch on one of said members projecting into a recess in the other of said members, and a screw-operated wedging ball bearing against said latch for forcing said latch and abutment against the sides of said recess, said abutment being positioned in said recess to prevent movement of said material supporting member on said guide member in the direction of the feed thereof when said latch is released.

6. In a slicing machine having a material supporting member, a guide member, and mechanism associated with said guide member for feeding said members in one direction, means for detachably connecting said members together comprising an abutment and a releasable latch on said guide member adapted to project into and bear against the sides of a dove-tailed recess in said material supporting member, and a screw-operated wedging means bearing against said latch member for forcing said latch and abutment against the sides of said recess, said abutment being positioned in said recess to prevent movement of said material supporting member on said guide member in the direction of the feed thereof when said latch is released.

7. A slicing machine comprising a feed table, a guide, a pair of abutments on said guide movable relatively to each other, a recess in said table having two sides thereof sloping away from each other in a direction towards the upper side of said table, said abutments extending into said recess from the underside of said table and adapted to co-operate with the sloping sides of said recess, and means to hold said abutments in engagement with said sloping sides.

8. A slicing machine comprising a feed table, a guide, a pair of abutments on said guide movable relatively to each other, a recess in said table having two sides thereof sloping away from each other in a direction towards the upper side of said table, said abutments extending into said recess from the underside of said table and adapted to co-operate with the sloping sides of said recess, and means to hold said abutments in engagement with said sloping sides comprising a ball adapted to move in between said abutments to cause said abutments to move outwardly.

9. A device as claimed in claim 8 in which the abutments are normally yieldingly moved toward each other.

In testimony whereof I have signed my name to this specification on this 17th day of September, A. D. 1928.

JOHANNES C. van BERKEL.